United States Patent
Berlureau et al.

(10) Patent No.: US 6,444,349 B1
(45) Date of Patent: Sep. 3, 2002

(54) SEALED NICKEL-METAL HYDRIDE STORAGE CELL

(75) Inventors: Thierry Berlureau; Jean-Louis Liska, both of Bordeaux (FR)

(73) Assignee: Alcatel, Paris (FR)

( * ) Notice: Subject to any disclaimer, the term of this patent is extended or adjusted under 35 U.S.C. 154(b) by 126 days.

(21) Appl. No.: 09/624,993

(22) Filed: Jul. 25, 2000

(30) Foreign Application Priority Data

Aug. 9, 1999 (FR) .............................................. 99 10311

(51) Int. Cl.[7] ...................... H01M 10/34; H01M 10/30; H01M 4/32; H01M 4/38
(52) U.S. Cl. .............................. 429/60; 429/50; 429/53; 429/218.2; 429/223
(58) Field of Search .................... 429/59, 60, 218.2, 429/223, 50, 53

(56) References Cited

U.S. PATENT DOCUMENTS

| | | | |
|---|---|---|---|
| 4,214,043 A | * | 7/1980 | van Deutekom ............ 429/223 |
| 4,275,127 A | | 6/1981 | Ritterman et al. ............ 429/50 |
| 4,643,959 A | | 2/1987 | Glotzl et al. ................. 429/222 |

FOREIGN PATENT DOCUMENTS

| | | |
|---|---|---|
| EP | 0 341 782 A | 11/1989 |
| FR | 2 382 776 A | 9/1978 |

* cited by examiner

*Primary Examiner*—Patrick Ryan
*Assistant Examiner*—Jonathan Crepeau
(74) *Attorney, Agent, or Firm*—Sughrue Mion, PLLC

(57) ABSTRACT

A sealed nickel-metal hydride storage cell comprises a positive electrode whose electrochemically reactive material is a hydroxide containing principally nickel and a negative electrode whose electrochemically active material is an intermetallic compound capable of forming a hydride when charged. The total quantity of electrochemically active material in the negative electrode exceeds the total quantity of electrochemically active material in the positive electrode so that the total negative capacity exceeds the total positive capacity by an amount of at least 15% referred to as the overcapacity. Part of the overcapacity, referred to as the precharge, is partly in the charged state when the positive electrode is completely discharged and the remaining part, referred to as the surplus, is in the discharged state when the positive electrode is completely charged. The precharge is less than 10% of the negative overcapacity.

12 Claims, 1 Drawing Sheet

SEALED NICKEL-METAL HYDRIDE STORAGE CELL

BACKGROUND OF THE INVENTION

1. Field of the Invention

The invention relates to a sealed nickel-metal hydride (Ni-MH) storage cell with improved capacity per unit mass and per unit volume and increased service life. It relates more precisely to a storage cell of high capacity (at least 10 Ah) for aeronautical, stationary or rail applications, or for electric vehicle propulsion. Storage cells of this kind are usually combined to form batteries.

2. Description of the Prior Art

A storage cell is formed by the association at least one positive electrode whose electrochemically active material is principally nickel hydroxide $Ni(OH)_2$ and at least one negative electrode whose electrochemically active material is an intermetallic compound hydride M. The electrolyte is a concentrated alkaline solution including a plurality of hydroxides (KOH, NaOH, LiOH). A separator, generally made of polyolefin or polyamide, is placed between the positive electrode and the negative electrode.

The storage cell is charged by the following electrochemical reaction: the nickel hydroxide $Ni(OH)_2$ is oxidized until the valency of the nickel is greater than 2 and the metal hydride MH is formed at the same time by proton transfer:

discharged form

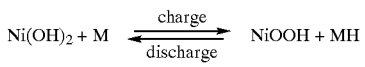

charged form

The positive electrode contains the electrochemically active material and other substances, in particular a conductive material intended to increase the conductivity of the electrode and certain additives required by the shaping process. These substances are also oxidized during charging, causing the parallel reduction of some of the negative active material.

The conductive material usually comprises metallic cobalt ($CO^0$) and cobalt hydroxide ($Co^{2+}$) which is transformed into $Co^{3+}$ to assure electrical conduction in the electrode; this reaction is not reversible. The organic additives added to facilitate shaping of the electrode are oxidized irreversibly during the first few cycles.

At the beginning of the service life of the storage cell these irreversible reactions in the positive electrode induce a charged capacity in the negative electrode which is referred to as the "precharge" and which cannot be discharged in a sealed storage cell. The precharge mobilizes a high proportion of the alloy to no useful effect and reduces the potential capacities per unit mass and per unit volume of the negative electrode and therefore of the storage cell.

When the positive electrode is charged oxygen is released and this oxygen is reduced (recombined) at the negative electrode. It is essential to avoid the release of hydrogen at the negative electrode at the end of charging because the resulting increase in the internal gas pressure would open the relief valve. Once the positive electrode has been fully charged, the negative electrode must therefore still contain a "surplus" of uncharged active material.

During cycling, the surplus negative capacity is consumed primarily by corrosion of the alloy in accordance with the reactions:

where d is the average degree of oxidation of the alloy M.

The active material constituting the surplus is charged progressively and increases the unusable precharge commensurately. The service life of the storage cell is therefore closely dependent on the surplus quantity of uncharged active material.

During overcharging or accidental overdischarging the internal pressure of an Ni-MH storage cell can increase greatly. To maintain a reversible equilibrium in the storage cell under all conditions, U.S. Pat. No. 4,214,043 teaches that the quantity of electrochemically active material in the negative electrode must be greater than that of the material in the positive electrode and that the electrochemically active mass of the negative electrode must be partially present in the charged state when the positive electrode is in the completely discharged state. To achieve this aim the total electrochemical capacity of the negative electrode is preferably at least 15% greater than that of the positive electrode and the part of the negative capacity which cannot be discharged preferably represents at least 10% of this additional capacity.

The object of the present invention is to propose an Ni-MH storage cell whose service life is increased without reducing the capacities per unit mass and per unit volume of the storage cell.

SUMMARY OF THE INVENTION

The present invention provides a sealed nickel-metal hydride storage cell comprising a positive electrode whose electrochemically reactive material is a hydroxide containing principally nickel and a negative electrode whose electrochemically active material is an intermetallic compound capable of forming a hydride when charged, wherein the total quantity of electrochemically active material in the negative electrode exceeds the total quantity of electrochemically active material in the positive electrode so that the total negative capacity exceeds the total positive capacity by an amount of at least 15% referred to as the overcapacity, part of the overcapacity, referred to as the precharge, is partly in the charged state when the positive electrode is completely discharged and the remaining part, referred to as the surplus, is in the discharged state when the positive electrode is completely charged, and the precharge is less than 10% of the negative overcapacity.

The precharge must represent the smallest possible proportion of the negative overcapacity in order to increase the surplus negative capacity without increasing the overcapacity. The surplus capacity therefore represents more than 90% of the negative overcapacity. The consumption of the surplus reduces the service life of the storage cell. Thus the greater the quantity of uncharged active material constituting the surplus, the longer the service life of the storage cell. The precharge is preferably less than 6% and even more preferably less than 2% of the negative overcapacity.

The negative overcapacity is preferably from 20% to 60%, i.e. the quantities of electrochemically active material in the electrodes are chosen so that the total negative capacity is from 1.20 to 1.60 times the total positive capacity. The overcapacity is preferably from 38% to 46% of the positive capacity.

The expression "nickel hydroxide" refers to a hydroxide containing principally nickel but also at least one syncrystallized hydroxide of an element chosen from zinc, cadmium, magnesium and aluminum; it can also contain at least one syncrystallized hydroxide of an element chosen from cobalt, manganese, yttrium, calcium and zirconium.

The advantage of the present invention is that it increases the service life of the storage cell without penalizing its performance. When the storage cell enters service, the negative overcapacity is for the most part made up of an uncharged surplus capacity on which the service life depends. The surplus capacity can be regenerated in use, increasing the service life of the storage cell commensurately.

The present invention also provides a method of reducing the precharge of a nickel-metal hydride storage cell as previously described, the method including a treatment consisting of discharging at least some of the precharge.

In a first embodiment the treatment consists of discharging said storage cell at a moderate current. Said storage cell is preferably discharged at a current not greater than the current needed to discharge the capacity of said storage cell in one hour.

The precharge reduction treatment consists of overdischarging the positive electrode, which reverses it and releases hydrogen at the positive electrode. The negative precharge is discharged in parallel with this.

The over discharged capacity must of course not exceed the value of the negative precharge at the time the precharge reduction treatment begins. The charged electrochemically active material constituting the precharge before the reduction treatment increases the negative surplus when discharged.

In a first variant the treatment causes the release of hydrogen at the positive electrode and the storage cell has a relief valve adapted to open at a relative pressure less than 3 bars to expel the hydrogen.

The hydrogen released increases the pressure inside the storage cell. If the storage cell is closed, this pressure rise expels gases via the relief valve as soon as the pressure at which it opens is reached. This has the advantage of evacuating the nitrogen present in the storage cell at the same time as the hydrogen and therefore of reducing the subsequent working pressure.

However, in this case there is no control of possible reabsorption by the negative electrode of the hydrogen released at the positive electrode. This drawback can be eliminated by evacuating the hydrogen as and when it is released, in particular by pumping it out.

In a second variant the treatment causes the release of hydrogen at the positive electrode which is evacuated to the exterior of the storage cell as and when it is formed.

In a second embodiment the treatment consists of storing the storage cell at a temperature not less than ambient temperature (20° C.). The maximum temperature to which the storage cell can be exposed is set by the aqueous electrolyte. The storage temperature is preferably from 40° C. to 90° C.

In a first variant the treatment causes the release of hydrogen at the negative electrode and the storage cell has a relief valve adopted to open at a relative pressure less than 3 bars to expel the hydrogen.

The precharge reduction treatment uses an in-cell solid-gas desorption thermodynamic process related to the difference in hydrogen pressure between the metal hydride and its environment. It is encouraged by increasing the temperature of the hydride and/or reducing the ambient hydrogen pressure, in particular by using a pump or a low-pressure valve.

In a second variant the treatment causes the release of hydrogen at the negative electrode which is evacuated to the exterior of the storage cell as and when it is formed.

The storage time depends on the temperature at which it is effected. It is generally at least 15 minutes and con be as much as 24 hours.

In a third embodiment the treatment consists of introducing into the storage cell an oxidizing agent capable of discharging the intermetallic compound. The oxidizing agent is air, oxygen, oxygenated water or a nitrate ion, for example.

In a first implementation the precharge reduction method previously described is applied to fabricating a nickel-metal hydride storage cell. The precharge reduction treatment is carried out after the electrical formation of the storage cell and before it enters service.

An analogous treatment can also be applied to a storage cell in use whose precharge has increased during cycling because of the incomplete discharging of the positive electrode. A treatment of this kind increases the surplus negative capacity during cycling and increases the service life of the storage cell.

In a second implementation the precharge reduction method previously described is applied to regenerating a nickel-metal hydride storage cell in use.

The invention will be better understood and other advantages and features of the invention will become apparent in the course of the following description, which is given by way of illustrative and non-limiting example and with reference to the accompanying drawings.

DETAILED DESCRIPTION OF THE PREFERRED EMBODIMENT

EXAMPLE 1

A prior art storage cell W1 was made with a nominal capacity C=21 Ah.

The storage cell included a paste-type positive electrode comprising a nickel foam support and an active layer. The active layer was a paste containing the electrochemically active material introduced into the pores of the support. The electrochemically active material was a nickel-based hydroxide containing in particular syncrystallized cobalt.

The storage cell also included a foam support negative electrode whose electrochemically active material was an $AB_5$ type alloy able to form a hydride.

The electrodes were placed on opposite sides of a polyolefin or polyamide felt separator to form an electrode stack. The electrode stack was placed in a container and impregnated with an alkaline electrode including a mixture of potassium hydroxide (KOH), sodium hydroxide (NaOH) and lithium hydroxide (LiOH) at a concentration of 8.5N in aqueous solution. The lid was then fitted, fixed and sealed to the container.

After closing the container, the storage cell was subjected to two electrical cycles to form the electrochemically active material under the following conditions:

charging at a current from Ic/100 to Ic/3, where Ic is the current needed to discharge the nominal capacity C in one hour, then discharging at Ic/3 to 1.0V.

Figure 1:
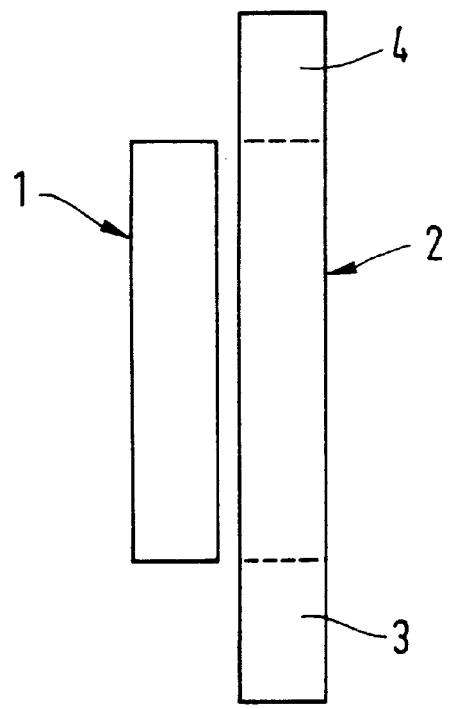
FIG. 1 is a diagram showing the capacity of a positive electrode and the capacity of a negative electrode of a storage cell before carrying out a precharge reduction treatment.

The storage cell W1 obtained had a positive electrode 1 of total capacity Cp and a negative electrode 2 of total capacity Cn greater than Cp, as shown in FIG. 1. The difference between the capacities Cp and Cn, referred to as the overcapacity Cs, was made up of a precharge 3 which remained in the charged state (Cc) when the positive electrode was completely discharged and a surplus capacity 4 which remained in the discharged state (Cd) when the positive electrode was completely charged.

EXAMPLE 2

A storage cell X1 in accordance with the present invention with a nominal capacity C=21 Ah was made and was analogous to that of example 1 except that the second forming cycle included an additional discharge beyond 1 V at a current of Ic/3 during which the gases released were evacuated to the exterior by means of a pump to prevent the hydrogen released at the positive electrode being reabsorbed by the negative electrode.

The positive electrode was reversed as soon as the voltage of the electrode stack reached −0.35 V. The precharge of the negative electrode was practically cancelled out when the voltage of the electrode stack reached −0.40 V. The discharging was then stopped at −0.40 V in order not to overdischarge the negative electrode, which would have damaged it irreversibly.

The initial precharge, meaning the part of the precharge generated by forming the positive electrode, was therefore minimized.

The capacity discharged during this additional discharge was 3.5 Ah, i.e. 17% of the nominal capacity C of the storage cell.

EXAMPLE 3

A storage cell X2 in accordance with the present invention with a nominal capacity C=21 Ah was made and was analogous to that of example 2 except that the second forming cycle included an additional discharge beyond −0.40 V at a current of Ic/5, which raised the capacity discharged during this additional discharge to 0.5 Ah, i.e. 2% of the nominal capacity C.

Figure 2:
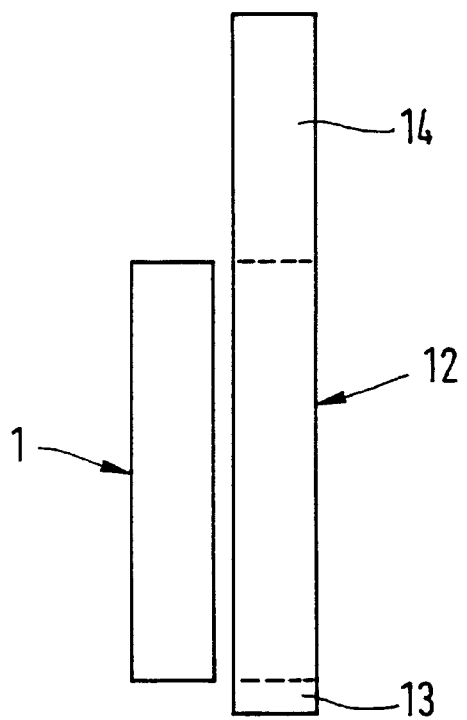
FIG. 2 is analogous to FIG. 1 and shows the capacity of a positive electrode and the capacity of a negative electrode of a storage cell according to the present invention after carrying out the precharge reduction treatment.

The storage cell included a positive electrode 1 of total capacity Cp and a negative electrode 12 of total capacity Cn, as shown in FIG. 2. The negative electrode 12 had a precharge 13 which was very much less than the precharge 3 of the negative electrode 2 from example 1 and a surplus 14 which was greater than the surplus 4 of the negative electrode 2 from example 1.

EXAMPLE 4

A storage cell Y1 in accordance with the present invention with a nominal capacity C=21 Ah was made and was analogous to that of example 1 except that the storage cell was stored for 4.5 hours at 40° C.

After storage the pressure inside the storage cell was −0.97 bar relative to atmospheric pressure (30 mbars absolute).

EXAMPLE 5

A storage cell Y2 in accordance with the present invention was made which was analogous to that from example 4 except that it was stored at 70° C. for 40 minutes.

At the end of the storage the pressure inside the storage cell was −0.90 bar relative to atmospheric pressure (100 mbars absolute).

EXAMPLE 6

A storage cell Y3a in accordance with the present invention with a nominal capacity C=21 Ah was made and was analogous to that of example 4 except that it was stored at 90° C. for 25 minutes.

At the end of the storage the pressure inside the storage cell was −0.8 bar relative to atmospheric pressure (200 mbars absolute).

EXAMPLE 7

A storage cell Y3b in accordance with the present invention was made which was analogous to that from example 6 except that it was stored at 90° C. for one hour with the container open to allow the gas to escape. After storage the pressure inside the storage cell was 1 bar absolute (atmospheric pressure).

The storage cells made as described above were evaluated electrochemically in the following manner.

After forming and possible additional treatment the internal resistance R of the storage cells in $m\Omega.dm^2$ and their actual capacity Cp in Ah were measured by discharging them at a current of Ic/3 to 1 Volt. The capacity of the storage cell was limited by the positive capacity.

The storage cells were then dismantled. The total negative capacity Cn in Ah and the overcapacity Cs in Ah which included the negative precharge Cc in Ah and the surplus negative capacity CC in Ah were measured during discharge at a current of Ic/3.

The percentage negative overcapacity Cs relative to the positive overcapacity Cp and the percentage of that overcapacity Cs consisting of the precharge Cc were calculated.

The efficiency of the precharge reduction treatment, defined as the quantity of precharge eliminated by the treatment as a percentage of the precharge of an untreated electrode, was then evaluated.

Finally, the release of hydrogen at the negative electrode was monitored by monitoring the pressure variation ΔP in bars during charging at a current of Ic/3.

The results obtained are set out in the table below.

TABLE

| Cell | W1 | X1 and X2 | Y1 | Y2 | Y3a | Y3b |
|---|---|---|---|---|---|---|
| Treatment | none | addl. disch. | 40° C. 4.5 h | 70° C. 40 min | 90° C. 25 min | 90° C. 1 h |
| R ($m\Omega \cdot dm^2$) | 15.1 | 15.1 | 16.1 | 17.4 | 18.2 | 13.8 |
| Cp (Ah) | 21.2 | 21.2 | 21.2 | 20.7 | 20.4 | 20.7 |
| Cn (Ah) | 29.6 | 29.6 | 29.6 | 29.6 | 29.6 | 29.6 |
| Cs (Ah) | 8.4 | 8.4 | 8.4 | 8.9 | 9.2 | 8.9 |
| Cs/Cp (%) | 39.5 | 39.5 | 39.5 | 44.5 | 44 | 44.5 |
| Cd (Ah) | 4.4 | 8.35 | 7.95 | 8.8 | 9.1 | 8.8 |
| Cc (Ah) | 4.0 | 0.05 | 0.45 | 0.1 | 0.1 | 0.1 |
| Cc/Cs (%) | 48 | 0.6 | 5.4 | 1.1 | 1.1 | 1.1 |
| E (%) | 0 | 99 | 89 | 98 | 98 | 98 |
| ΔP (bar) | 1.8–2.1 | 0.3–0.5 | 0.6–0.7 | 0.5–0.7 | 0.4–0.5 | 0.5–0.7 |

Note that in all cases (examples 2 to 7) the precharge reducing treatment was found to be efficient at reducing the precharge by at least 89% (storage cell Y1), in some cases virtually eliminating it (storage cells X1 and X2).

The pressure at the end of charging was low (less than 1 bar relative and in some cases less than atmospheric pressure) compared to that observed with no precharge reduction treatment.

Of course, a treatment analogous to one of those described in the examples can be applied to regenerate the storage cell in use, to reduce the precharge, which has increased during cycling.

What is claimed is:

1. A sealed nickel-metal hydride storage cell comprising at least one positive electrode whose electrochemically reactive material is a hydroxide containing principally nickel and at least one negative electrode whose electrochemically active material is an intermetallic compound capable of forming a hydride when charged, wherein the total quantity of electrochemically active material in said negative electrode exceeds the total quantity of electrochemically active material in said positive electrode so that the total negative capacity exceeds the total positive capacity by an amount of at least 15% referred to as the overcapacity, part of said overcapacity, referred to as the precharge, is in the charged state when said positive electrode is completely discharged and the remaining part, referred to as the surplus, is in the discharged state when said positive electrode is completely charged, and said precharge is less than 10% of said negative overcapacity.

2. The storage cell claimed in claim 1 wherein said precharge is less than 6% of said negative overcapacity.

3. The storage cell claimed in claim 1 wherein said precharge is less than 2% of said negative overcapacity.

4. The storage cell claimed in claim 1 wherein said negative overcapacity is greater than 20% and less than 60%.

5. A method of reducing the precharge of a storage cell according to claim 1, said method including a treatment comprising discharging at least some of said precharge.

6. The method claimed in claim 5 wherein said treatment comprises discharging said storage cell at a moderate current.

7. The method claimed in claim 6 wherein said storage cell is discharged at a current not greater than the current needed to discharge the capacity of said storage cell in one hour.

8. The method claimed in claim 5 wherein said treatment comprises storing said storage cell at a temperature not less than ambient temperature.

9. The method claimed in claim 8 wherein the storage temperature is from 40° C. to 90° C.

10. The method claimed in claim 5 wherein said treatment causes the release of hydrogen and said storage cell has a relief valve adapted to open at a relative pressure less than 3 bars to expel said hydrogen.

11. The method claimed in claim 5 wherein said treatment causes the release of hydrogen which is evacuated to the exterior of said storage cell as and when it is formed.

12. The method claimed in claim 5 wherein said treatment comprises introducing into said storage cell an oxidizing agent capable of discharging said intermetallic compound.

* * * * *